United States Patent [19]

Ridley, Jr. et al.

[11] 4,034,939
[45] July 12, 1977

[54] ASSEMBLY FOR SEALING THE MOUNTING OPENING FOR A FLYING HORIZONTAL STABILIZER ON A VERTICAL STABILIZER

[75] Inventors: Thomas R. Ridley, Jr., Kent; Gerald C. Simmons, Kirkland, both of Wash.

[73] Assignee: The Boeing Company, Seattle, Wash.

[21] Appl. No.: 629,120

[22] Filed: Nov. 5, 1975

[51] Int. Cl.² .................................................. B64C 9/02
[52] U.S. Cl. .................................. 244/87; 244/48; 244/130
[58] Field of Search ............ 244/7 C, 12 A, 46, 48, 244/56, 87, 130; 115/.5 S; 49/41, 483, 48 S; 277/166, 212 F; 89/37.5 D, 37.5 R, 37.5 A, 36 L; 403/288

[56] References Cited

U.S. PATENT DOCUMENTS

| | | | |
|---|---|---|---|
| 2,461,669 | 7/1944 | Wiley | 244/48 |
| 2,981,504 | 4/1961 | Parker | 244/48 |
| 3,109,614 | 10/1961 | Steidl | 244/87 |
| 3,417,946 | 12/1967 | Hartley | 244/87 |
| 3,529,839 | 9/1970 | Greiner et al. | 115/.5 S |
| 3,545,770 | 12/1970 | Wheelock | 89/36 L |
| 3,756,529 | 9/1973 | Backlund et al. | 244/48 |

*Primary Examiner*—George E. A. Halvosa
*Assistant Examiner*—Galen Barefoot

*Attorney, Agent, or Firm*—Christensen, O'Connor, Garrison & Havelka

[57] ABSTRACT

A seal assembly for covering the structural opening in the side of a vertical stabilizer, through which extends a structural member for pivotally mounting a flying horizontal stabilizer to structure within the vertical stabilizer retards or prevents ambient air flow between the upper and lower surfaces of the horizontal stabilizer. A seal plate is affixed to the inner end of the horizontal stabilizer, is faired into the upper and lower horizontal stabilizer surfaces, and extends outwardly therefrom in a direction transverse to the horizontal stabilizer. The shape of the periphery of the seal plate is chosen at a predetermined position of the horizontal stabilizer so as to equidistantly space the periphery of the seal plate from that portion of the outer surface of the skin of the vertical stabilizer underlying or adjacent the periphery of the seal plate. A resilient, flexible seal member is affixed to the periphery of the seal plate and engages the surface of the vertical stabilizer in sealing engagement. When in the predetermined position, the seal member is partially flexed or compressed so that as the seal plate moves with the flying horizontal stabilizer, a sealing relationship will be maintained between the seal member and the surface of the vertical stabilizer even though the relative distance between the periphery of the seal plate and the surface of the stabilizer varies upon movement of the seal plate with the horizontal stabilizer.

9 Claims, 14 Drawing Figures

ASSEMBLY FOR SEALING THE MOUNTING OPENING FOR A FLYING HORIZONTAL STABILIZER ON A VERTICAL STABILIZER

BACKGROUND OF THE INVENTION

The present invention relates to seals between a movable airfoil member and the structure to which it is mounted, and more particularly, to a seal assembly for sealing the mounting hole in a vertical stabilizer through which the structural mounting member of a flying horizontal stabilizer extends.

Many aircraft employ variable incidence, horizontal airfoil surfaces, and especially horizontal stabilizer surfaces, to trim aircraft attitude during flight and to complement conventional control surfaces such as the elevator associated with a horizontal stabilizer. In such assemblies, the horizontal airfoil is coupled to the body of the aircraft for relative swinging movement, and in the case of an aircraft employing a T-tail configuration, a horizontal stabilizer surface is mounted on the vertical stabilizer for pivotal movement about a hinge axis transverse to the chord of the verical stabilizer.

In the latter instance, prior art construction techniques have required the addition of a shaped fairing member affixed to the central portion of the horizontal stabilizer that extends over and surrounds the upper end of the vertical stabilizer. These fairing assemblies are sometimes referred to as top hats. An additional fairing is affixed to the horizontal stabilizer and moves with the horizontal stabilizer as its incidence is varied when it is swung about its hinge axis. Such fairings are necessitated for several reasons, including the provision of aerodynamic structure to cover or surround the hinge structure for the horizontal stabilizer and the actuating means for varying its incidence. In addition the horizontal stabilizer and top hat are conventionally provided with a seal member between the moving portion of the horizontal stabilizer and top hat and the outer surface of the vertical stabilizer to prevent disturbance of the aerodynamic flow of air across the stabilizers that would oridinarily be caused by the gap between the horizontal stabilizer, the top hat and the vertical stabilizer surfaces. Because of the airfoil shape of the vertical stabilizer and the predetermined shape of the top hat and horizontal stabilizer, a seal surface is usually formed by reshaping the verical stabilizer in the region across which the edges of the top hat and horizontal stabilizer swing as the incidence of the latter is varied. The reshaping is necessary to provide a constant gap between the horizontal stabilizer and the vertical stabilizer so that a seal member can be effectively interposed to maintain a seal between the horizontal stabilizer and the vertical stabilizer at any position of the former. Such reshaping to the vertical stabilizer surface adjacent the area wiped by the seal necessitates additional structure, in turn greatly increasing the required weight and expense for constructing an empennage assembly employing a flying horizontal stabilizer, destroys the airfoil efficiency or a portion of the vertical stabilizer, and at the same time increases the drag on the aircraft.

It is a broad object of the invention to provide a seal assembly for sealing at least a portion of a variable incidence airfoil to aircraft structure on which it is mounted. It is a further object of the present invention to provide a T-tail construction for an aircraft that eliminates the need for a large, central aerodynamic fairing or top hat on the horizontal stabilizer and that eliminates the necessity for reshaping the airfoil of the vertical stabilizer under the area wiped by a seal associated with a flying horizontal stabilizer. Additional objects of the invention are to provide a T-tail assembly having a flying horizontal stabilizer that is easily manufactured and assembled and on which the seal structure can be adjusted after the major components of the T-tail are assembled, and to provide a seal member that can easily be replaced and maintained.

SUMMARY OF THE INVENTION

In accordance with the foregoing objects, and other objects that will become apparent to one of ordinary skill after reding the following specification, the present invention provides an improved seal assembly for sealing a variable incidence airfoil to an aircraft mounting structure having a curved surface oriented in a direction transverse to the axis about which the incidence of the airfoil is varied. In a preferred embodiment, the seal assembly is provided in combination with a vertical stabilizer and a flying horizontal stabilizer. The vertical stabilizer has a skin with an outer curved airfoil surface and an opening through the skin to the interior of the stabilizer. The horizontal stabilizer has an inner end positioned adjacent the opening in the vertical stabilizer and a structural member affixed to the inner end and extending through the opening into the vertical stabilizer. A hinge means is provided for mounting the horizontal stabilizer for upward and downward swinging movement about an axis oriented generally transversely to the chord line of the vertical stabilizer. The improved seal assembly comprises a seal plate affixed to and oriented transversely to the horizontal stabilizer and positioned adjacent the vertical stabilizer. The seal plate has a periphery so configured as to cover the opening in the vertical stabilizer in all positions of the horizontal stabilizer as it swings about its hinge axis. The periphery of the seal plate is so configured as to be spaced outwardly and preferably equidistantly from the skin of the vertical stabilizer when the horizontal stabilizer is oriented in a predetermined angle of incidence. This predetermined position is preferably the mean position between full up and full down angles of incidence of the horizontal stabilizer. A resilient seal means, for sealing the opening in the vertical stabilizer relative to the air surrounding the vertical and horizontal stabilizers to retard or prevent air flow between the upper and lower surfaces of the horizontal stabilizer adjacent the vertical stabilizer surface, is affixed to the peripheral portion of the seal plate and is interposed between the seal plate and the outer surface of the skin of the vertical stabilizer. The resilient seal means is partially compressed or deformed away from its normal relaxed position when the horizontal stabilizer is in the aforementioned predetermined position so that the seal means can flex bidirectionally transversely to the outer surface of the vertical stabilizer skin. This construction allows the shape of the contact region of the resilient seal means to vary relative to the shape of the periphery of the seal plate to maintain a constant sealing relationship between the seal plate and the outer surface of the skin of the verical stabilizer as the angle of incidence of the horizontal stabilizer is varied.

BRIEF DESCRIPTION OF THE DRAWINGS

A better understanding of the present invention can be derived by reading the ensuing specification in conjunction with the accompanying drawings wherein:

FIG. 11 is an enlarged sectional view of the T-tail assembly taken along a section line 3—3 of FIG. 1 showing the horizontal stabilizer in a normal level flight position;

DESCRIPTION OF PREFERRED EMBODIMENTS

Figure 1:
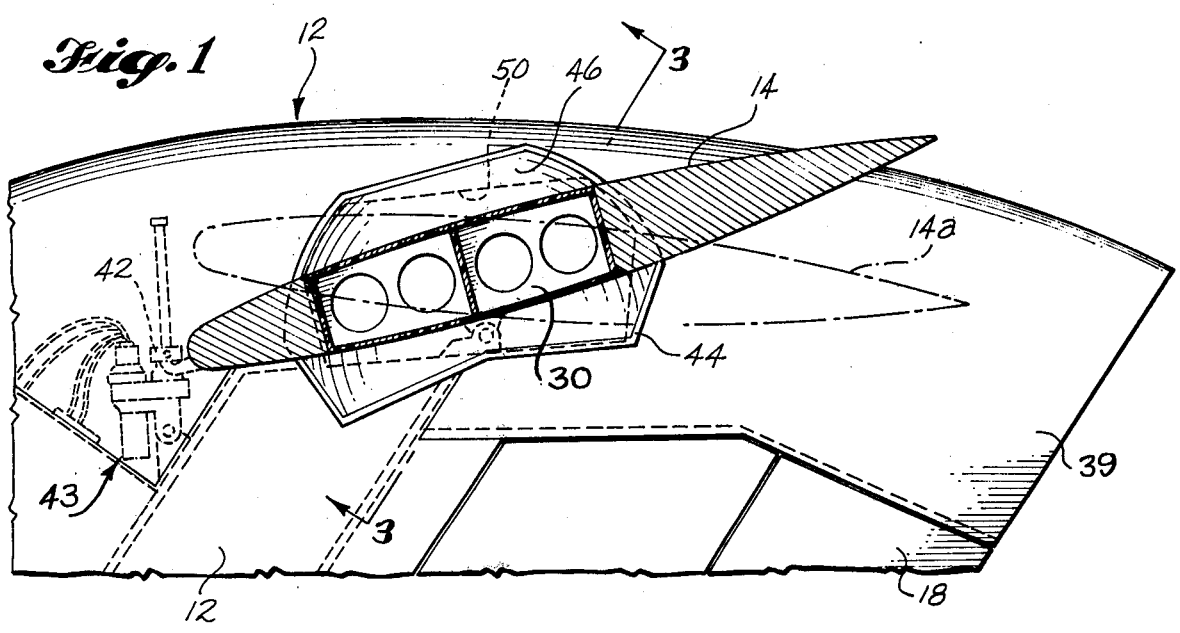
FIG. 1 is a side elevation view, in partial section, of the upper portion of a T-tail assembly having a variable incidence horizontal stabilizer with which the seal assembly of the present invention is employed.
Figure 2:
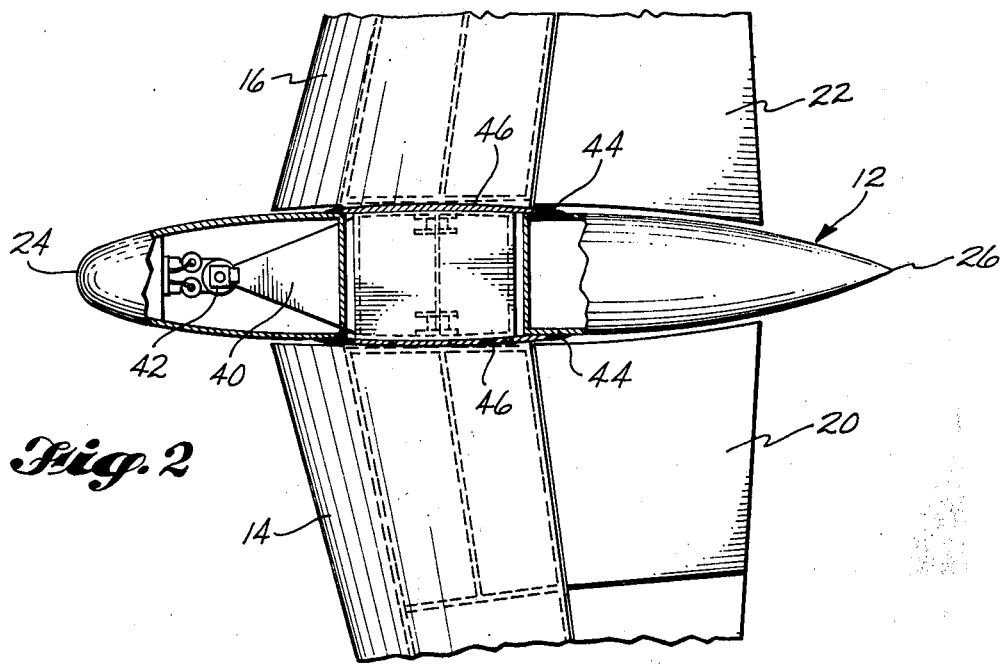
FIG. 2 is a top plan view, in partial section and reduced size, of the T-tail assembly shown in FIG. 1.
Figure 3:
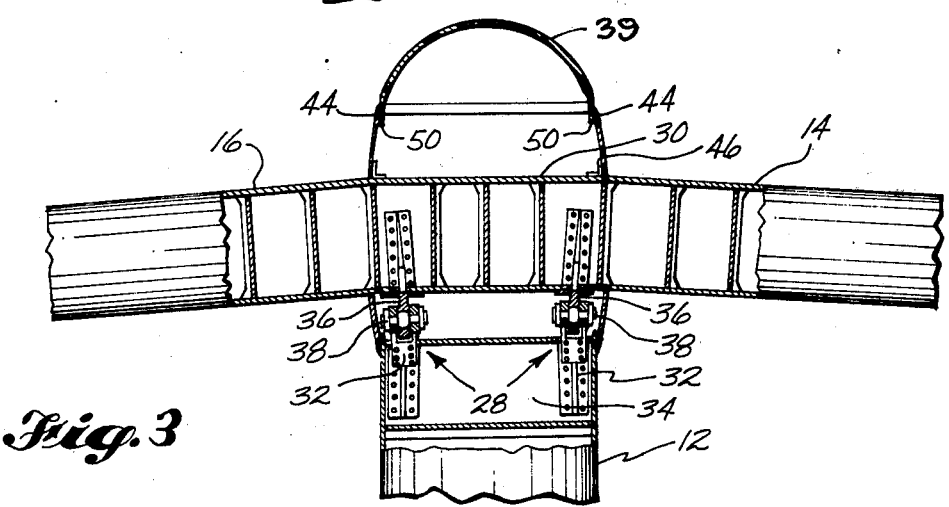
FIG. 3 is a front elevation view in partial section of the T-tail assembly of FIG. 1, showing the horizontal stabilizer in a normal level flight position.
Figure 4:
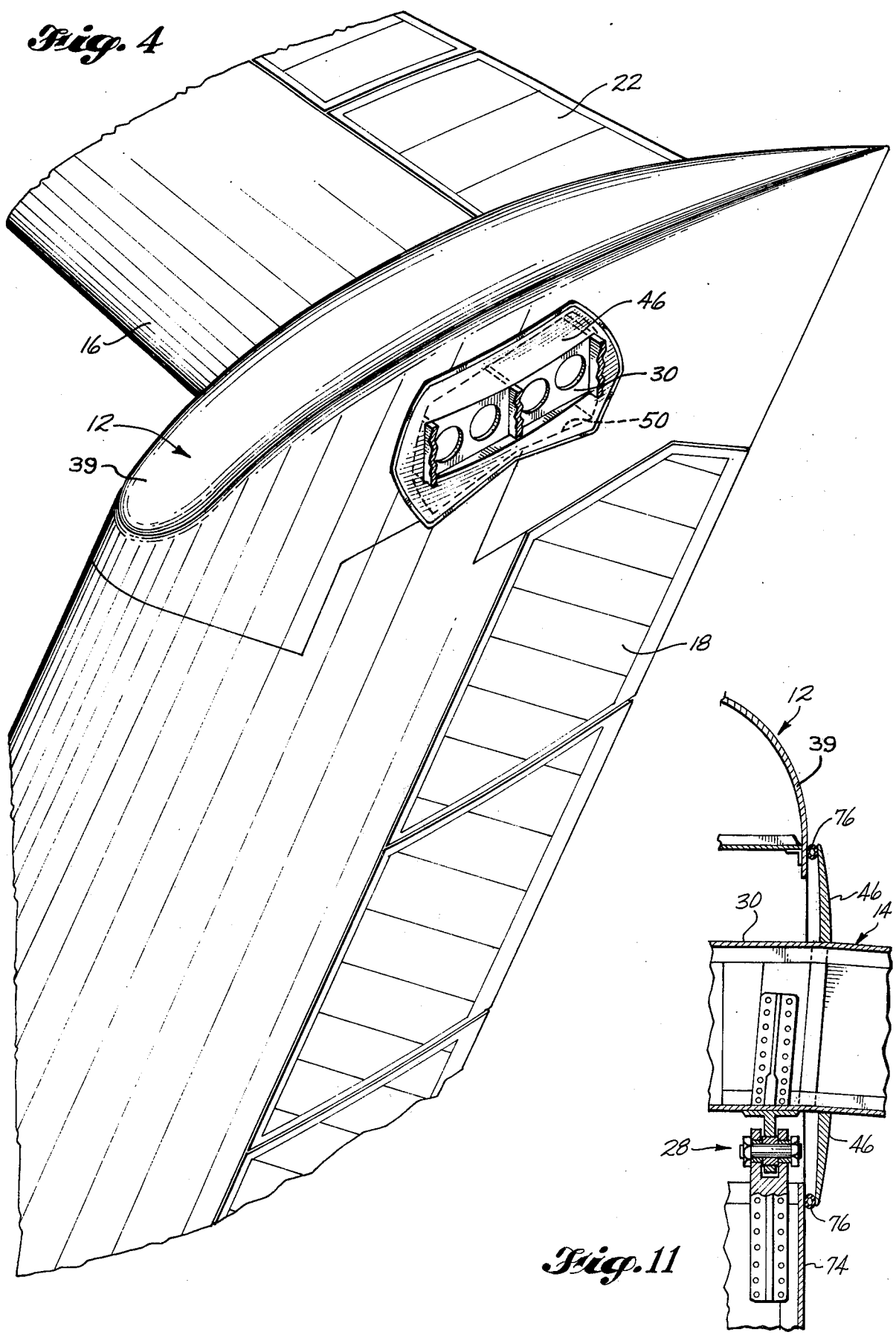
FIG. 4 is an enlarged isometric view of the T-tail assembly illustrated in FIGS. 1, 2 and 3 with the port segment of the horizontal stabilizer omitted.

The upper portion of an empennage of an aircraft having a T-construction as illustrated in FIGS. 1, 2 and 3 include the vertical stabilizer, 12 and a horizontal stabilizer, comprising a port segment 14 and a starboard segment 16. The vertical and horizontal stabilizers have conventional control surfaces including, respectively, rudder 18 and elevator sections 20 and 22. The vertical stabilizer 12 in transverse cross section, has an airfoil shape and includes a leading edge 24 and a trailing edge 26. The horizontal stabilizer is mounted on the vertical stabilizer for upward and downward swinging movement by a hinge assembly, generally designated 28. The port and starboard segments of the horizontal stabilizer are interconnected by spanwise extending structural beam 30 that extends transversely through the vertical stabilizer 12 and outwardly through openings 50 in the skin on both the port and starboard sides of the vertical stabilizer. These openings are positioned adjacent the upper end of the structural portion of the vertical stabilizer 12 and are sized to accommodate he structural beam 30 as it supports the horizontal stabilizer 14 for swinging movement. The hinge assembly 28 includes a pair of hinged support members 32 affixed by conventional fasteners to the generally vertically oriented central spar 34 of the vertical stabilizer adjacent its upper end. Hinge pivot members 36 are fixed by conventional fastening means to the central portion of the interconnecting horizontal structural beam 30 of the horizontal stabilizer. The hinge pivot members 36 are coupled to the hinge support members 32 by suitable bearings and pivot pins 38, thereby supporting the horizontal stabilizer for swinging movement about an axis oriented generally transversely to the chord of the vertical stabilizer.

The upper end of the vertical stabilizer comprises a nonstructural fairing member 39 affixed to and extending downwardly around the interconnecting horizontal structural beam 30 and is affixed in a conventional manner to the upper portion of the vertical stabilizer. The sides of the upper fairing member are faired into and form a smooth, upward and inward continuation of the surface skins of the vertical stabilizer 12. An arm 40 has its rearward end connected to the forward portion of the interconnecting horizontal structural beam 30 and extends forwardly therefrom within the interior of the vertical stabilizer 12. The forward end of the arm 40 carries a suitable jack screw nut 42 shown in phantom outline in FIG. 1 coupled to a suitable jack screw assembly, generally designated 43. By rotating the screw of the jack screw assembly 43 via a control actuated by the pilot, the horizontal stabilizer 14 can be positioned at any of a variety of desired angles of incidence. As shown in FIG. 1, the jack screw assembly 43 has positioned the horizontal stabilizer 14 in a full up position, a position that will cause the aircraft to pitch upwardly. As shown in ghost outline in FIG. 1, the jack screw assembly 44 can also position the horizontal stabilizer 14 in a full down position, i.e., a position causing the aircraft to pitch downwardly.

Referring back to FIG. 1, the outline of the opening 50 in the surface skin of the vertical stabilizer 12 is shown in dotted outline. The peripheral shape of the opening 50 is chosen to provide clearance for the movement of the interconnecting horizontal structural beam 30 as the horizontal sabilizer 14 is swung between its full up and full down positions. When the horizontal stabilizer 14 is in its full up position, the interconnecting structural beam 30 is oriented at an angle upwardly and forwardly. In this position the cross-sectional shape of the beam dictates the forward, lower peripheral limits of the outline of the opening and the upper, rearward peripherd limits of the outline of the opening. As the structural member is oriented downwardly and forwardly when the horizontal stabilizer 14 is swung to its full up position, shown in ghost outline, it can be seen that the cross-sectional shape of the interconnecting horizontal structural beam 30 dictates the upper, forward peripheral limits of the opening 50 and the lower, rearward peripheral limits of the outline of the opening. The upper portion of the opening 50 is defined by a straight line between the upper forward corner and the upper rearward corner. Likewise, the lower portion of the opening is defined by a straight line between the lower forward and lower rearward corners of the outline.

Seal plates 46 are affixed respectively to the port and starboard segments 14 and 16 of the horizontal stabilizers. The seal plates 46 are oriented generally transversely to the swing axis of the horizontal stabilizer, and if desired, are faired into the airfoil surface of the horizontal stabilizer. The peripheral contour of the seal plates 46 are dictated by the shape of the openings 50 in the surfaces of the vertical stabilizer. That is, the peripheral contour of the lower forward portion and of the uper rearward portion of the seal plate 46 is shaped so that the pheriphery of the seal plate extends outwardly, relative to the swing axis of the horizontal stabilizer, in elevation view, as in FIG. 1, beyond the outline of the opening 50 when the horizontal stabilizer is in its full down position (as shown in ghost outline). Likewise, when the horizontal stabilizer is in its full up position (as shown in solid outline), the peripheral contour of the upper forward and lower rearward portions of the seal plate 46 is shaped so that the periphery of the seal plate extends outwardly beyond the respective portions of the opening 50. In accordance with the present invention, a resiliently flexible seal member, discussed in more detail below, is interposed between the periphery of the seal plate and the portion of the outer surface of the vertical stabilizer skin adjacent the seal and surrounding the opening. The seal member shown in FIGS. 1 through 4 extends inwardly toward the outer portion of the outer surface of the skin of the vertical stabilizer 12 that underlies the periphery of the seal plate 46 and contacts the outer portion of the stabilizer surface in the sealing engagement to prevent or retard airflow between the central portions of the upper and lower surfaces of the horizontal stabilizer segments 14 and 16. The periphery of the seal plate is configured in a unique manner in the dimension transverse to the chord line of the vertical stabilizer so that the seal member will maintain constant sealing contact with the outer surface of the vertical stabilizer skins as it swings with the horizontal stabilizer to all angles of incidence of the latter. A preferred manner of forming the peripheral contour of the seal plates 46 is disclosed in more detail below.

Figure 5:
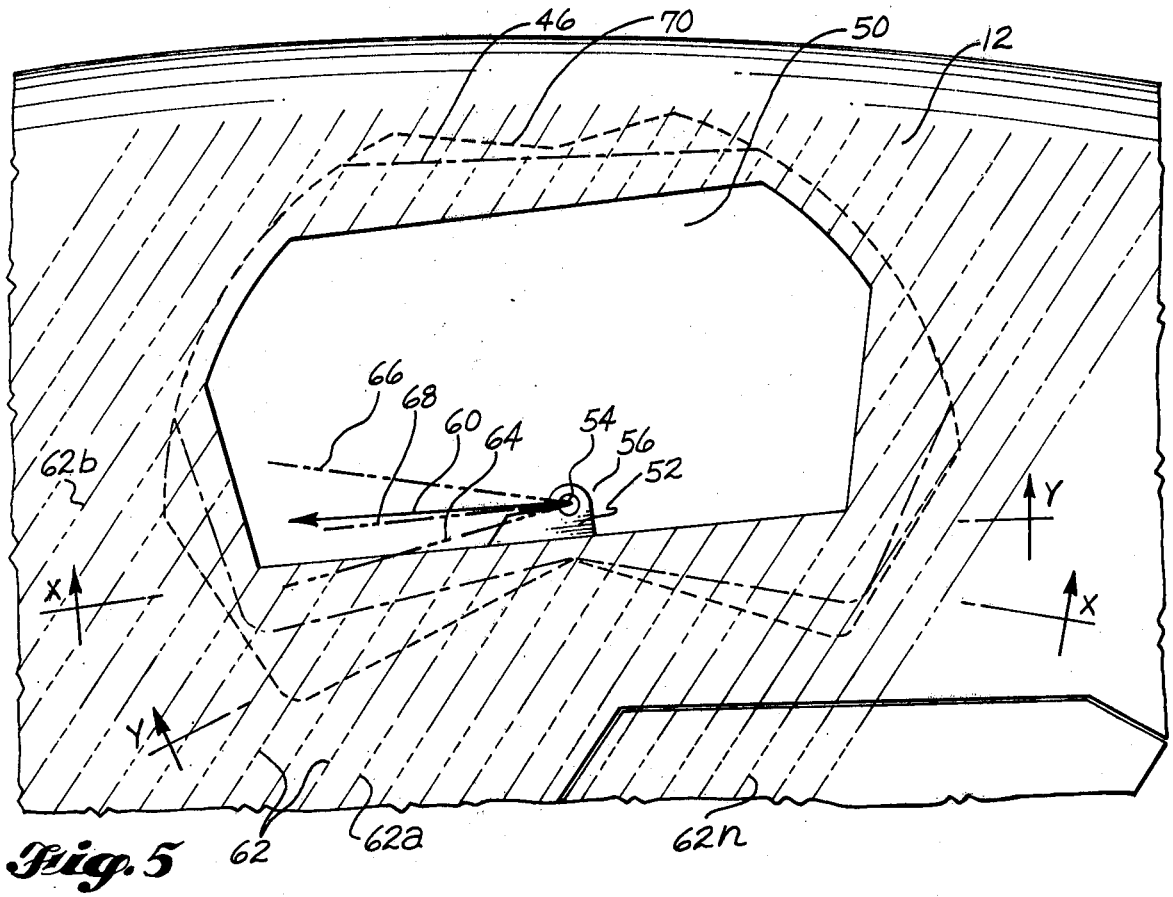
FIG. 5 is a greatly enlarged, side elevation view of the vertical stabilizer with the horizontal stabilizer omitted showing the location of the seal plate when the horizontal stabilizer is in a normal level flight position.

Referring to FIG. 5, an enlarged elevational view of an upper segment of the vertical stabilizer 12 surrounding the opening 50, through which the interconnecting structural member for the flying horizontal stabilizer segments extends, the plurality of angled, parallel, dot-dash reference lines 62 are the chord percentage reference lines of the constant chord swept-back vertical stabilizer 12. The percentage line 62a passing through the pivot axis 54 represents approximately the 50% chord line and lies approximately on the line of maximum thickness of the vertical stabilizer airfoil. The dot-dash outline 46 in FIG. 5 represents the position of the periphery of the seal plate attached to the flying horizontal stabilizer when the horizontal stabilizer is in its neutral or normal level flight position wherein its chord line is aligned relatively parallel to the longitudinal centerline of the aircraft. The chord line of the flying horizontal stabilizer in this position is oriented parallel to the arrow 60 emanating from the pivot axis 54.

Figure 8:
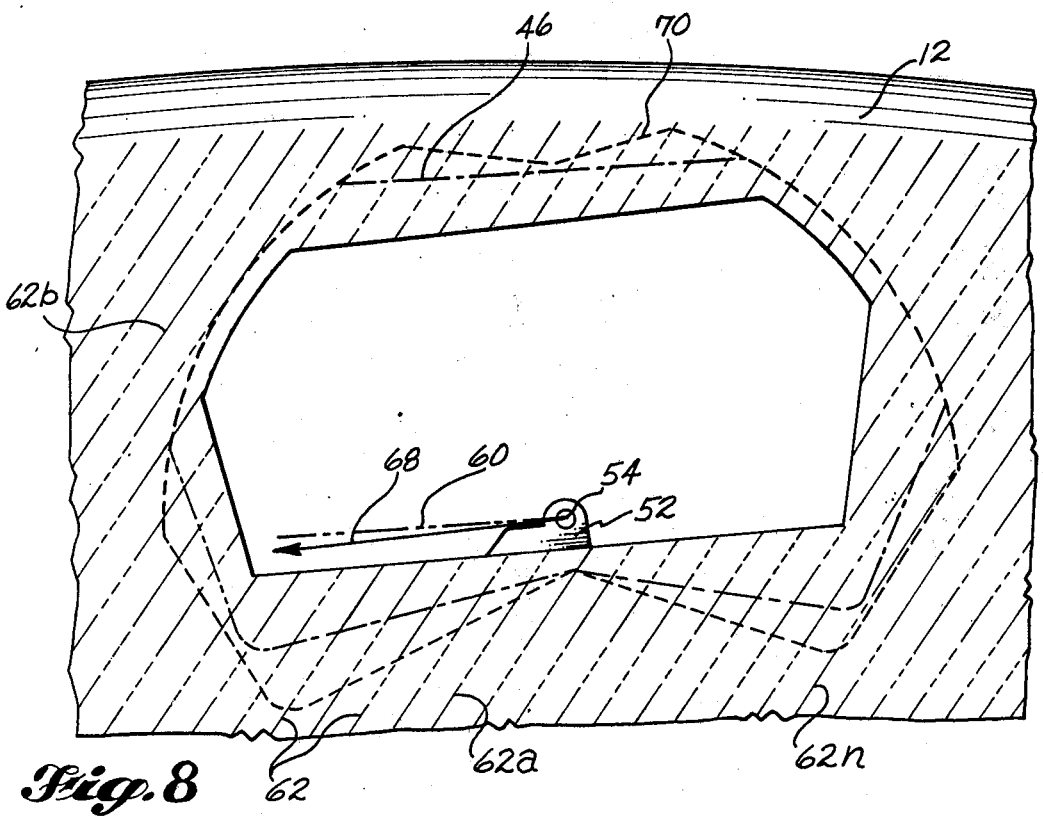
FIG. 8 is a view similar to FIG. 5 showing the location of the periphery of the seal plate when the horizontal stabilizer is at a mean position between the full up and the full down position.
Figure 6:
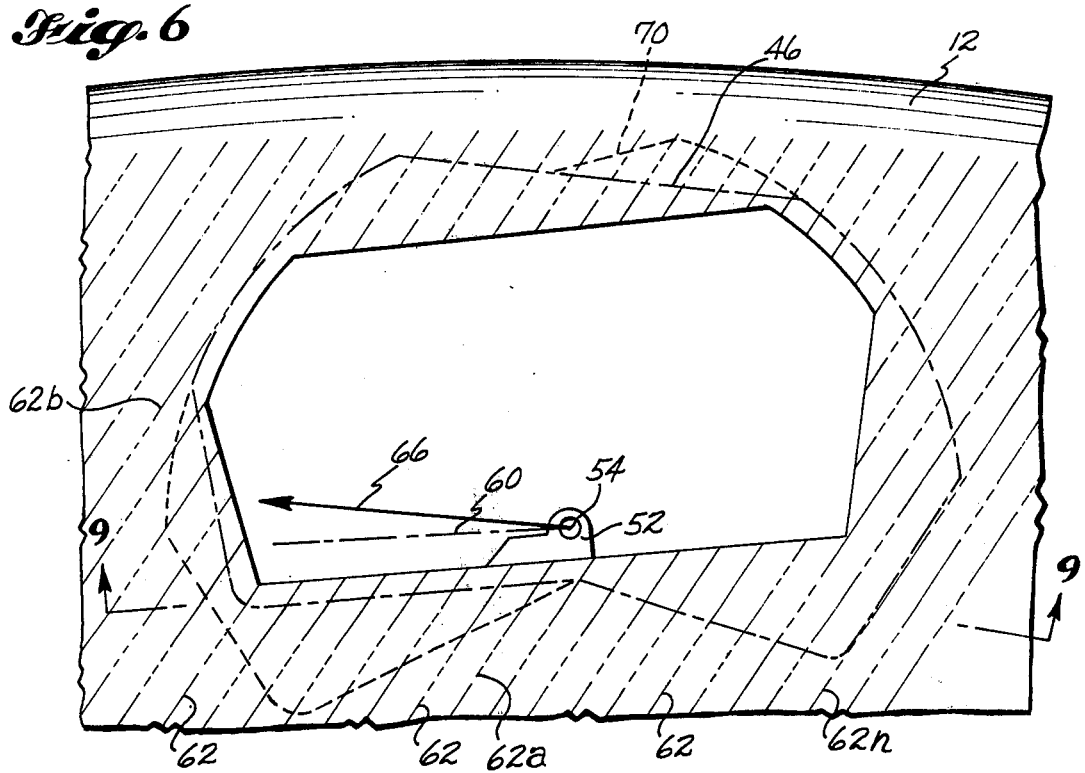
FIG. 6 is a view similar to FIG. 5 showing the location of the periphery of the seal plate when the horizontal stabilizer is in a full down position.
Figure 7:
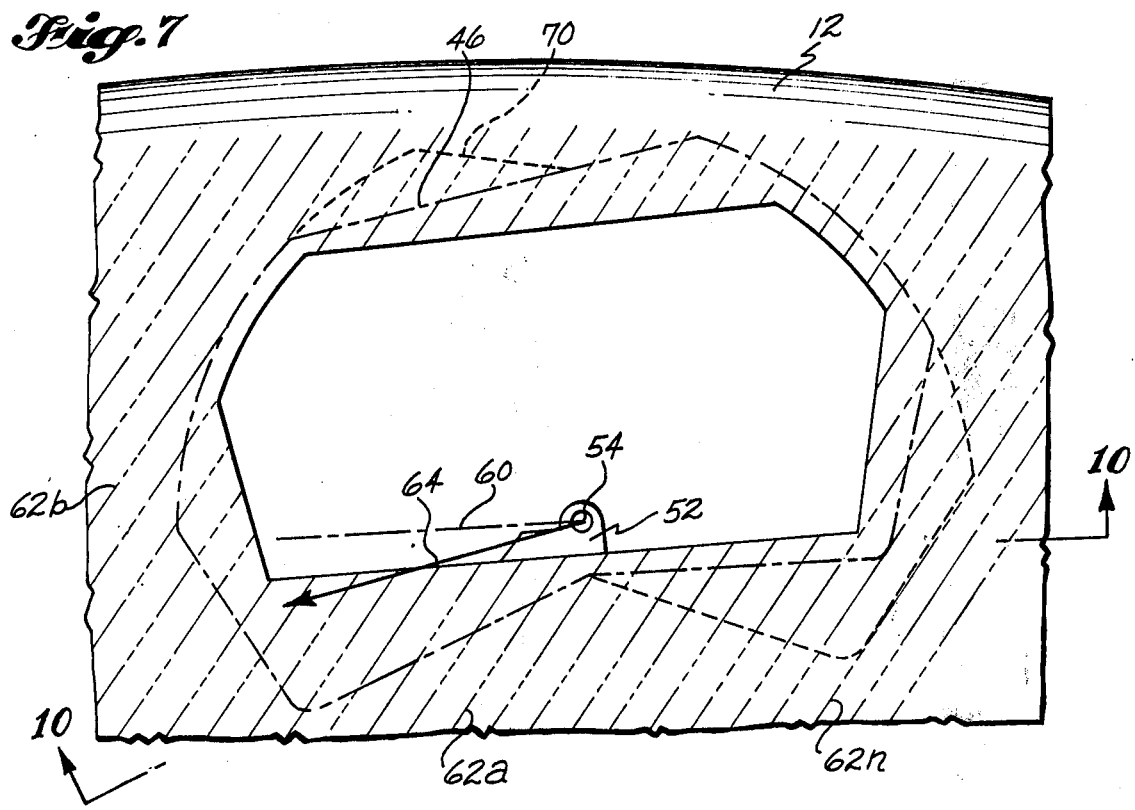
FIG. 7 is a view similar to FIG. 5 showing the location of the periphery of the seal plate when the horizontal stabilizer is in a full up position.

The flying horizontal stabilizer can swing between a full up position, represented by radium 64 emanating from the pivot axis 54, and a full down position, represented by the radius 66, also emanating from the pivot axis 54. The radius 68 represents the mean position of the horizontal stabilizer between its maximum up and down positions. As best seen in FIG. 6, when the horizontal stabilizer, and consequently the seal plate 46, are oriented in the full down position, the chord line of the horizontal stabilizer is oriented along the radius 66. In FIG. 7, the seal plate 46 is shown in its full up position wherein the chord line of the horizontal stabilizer is oriented parallel to the arrow 64. In FIG. 8, the seal plate 46 is shown in its mean position wherein the chord line of the horizontal stabilizer is oriented parallel to the arrow 68.

As explained above, the peripheral shape of the opening 50 is determined by the shape and positioning of the central portion structural member 30 interconnecting the port and starboard segments of the flying horizontal stabilizer and bu the arc through which the horizontal stabilizer swings to the maximum up and down positions. The peripheral shape of the seal plate 46 is determined by the maximum arc through which the seal plate must swing with the horizontal stabilizer and yet cover the opening 50 at all positions of the horizontal stabilizer. More specifically, the shape of the opening 50 determines the lower, forward peripheral shape and the upper, rearward peripheral shape when the horizontal stabilizer is in its full down position as shown in FIG. 6. Likewise, the upper, forward peripheral shape and the lower, rearward peripheral shape of the seal plate 46 are determined by the peripheral shape of the opening 50 when the seal plate 46 is in its full up position as shown in FIG. 7. In all such positions, the periphery of the seal plate extends outwardly, relative to the pivot axis, beyond the opening 50 so that the periphery of the seal plate overlies the portion of the outer surface of the vertical stabilizer adjacent to and surrounding the opening 50. This portion of the outer surface of the vertical stabilizer is within the dashed outline 70 around the opening 50 in FIGS. 5 through 8.

Referring conjunctively to FIGS. 5 through 10, it is a prime objective of the present invention to provide a means for sealing the opening 50 from airflow caused by pressure differentials between the upper and lower surfaces of the horizontal stabilizer. The present invention achieves this objective without alteration of the fixed contour of the outer surface of the vertical stabilizer airfoil that lies within and under the region covered by the periphery of the seal plate 46 as it swings between the full up and down positions. The airfoil of the vertical stabilizer has a predetermined varying thickness, usually measured from the chord line to the outer surface of the skin of the vertical stabilizer 12 at each one of the chord reference lines. From the chord reference line 62b to the chord reference line 62n, the outer surface of the skin of the vertical stabilizer 12 conforms to this predetermined varying thickness, and in the preferred embodiment of the vertical stabilizer, has a convex or airfoil shape in transverse (or chordwise) section. This convex shape is represented in the cross-sectional views of FIGS. 9 and 10 and is greatly exaggerated for purposes of clarity in illustration. This thickness of the airfoil of the vertical stabilizer 12 at any given chord reference line is represented as the distances $t_1$ and $t_2$. It is to be understood that a line, when drawn through the hinge axis 54 across the airfoil surface of the vertical stabilizer 12 in a direction transverse to the chord reference lines in plan view, will have a curvature in transverse section corresponding to the curvature of the airfoil surface of the vertical stabilizer underlying that line. As that line is moved about the hinge axis in the elevation view and approaches parallelism within the chord percentage lines 62, the curvature of that line in transverse section will become less and less. As the line is swung about the hinge axis 54 and approaches an orientation perpendicular to the chord percentage lines 62, the line in transverse section will become more curved and approach its maximum curvature, which occurs when the line is perpendicular to the chord percentage lines.

The present invention takes advantage of this geometrical relationship by adjusting the shape of the periphery of the seal plate 46 to conform to the curvature of the projection of the seal plate periphery onto the airfoil surface in elevation view when the seal plate is at its mean position 68 between its maximum up to maximum down positions. Referring to FIG. 8, the mean position of the periphery of the seal plate 46 as projected onto the skin of the vertical stabilizer is shown in dot-dash outline. A three dimensional curve is then plotted by determining the thickness of the airfoil at each of the points where the seal plate periphery projection intersects a chord reference line. A sufficient number of reference lines, as characterized by the reference lines 62 appearing on the elevation view, are chosen so that a smooth, three dimensional curve can be plotted. A seal plate is then constructed so that its peripheral contour conforms to the three dimensional contour of the line so plotted and represented by the dot-dash line 46 in FIG. 8. The central region of the seal plate 46 can be conformed to any desired shape, normally a shape that fairs into the central portion of the horizontal stabilizer 14 to which it is affixed. The seal plate 46 is mounted on the horizontal stabilizer and is positioned so that its periphery is equidistantly spaced outwardly from the surface of the skin 74 when the horizontal stabilizer is in its mean position. The distance between the seal plate periphery and the outer skin is represented to be $x$ in FIGS. 9 and 10.

Figure 9:
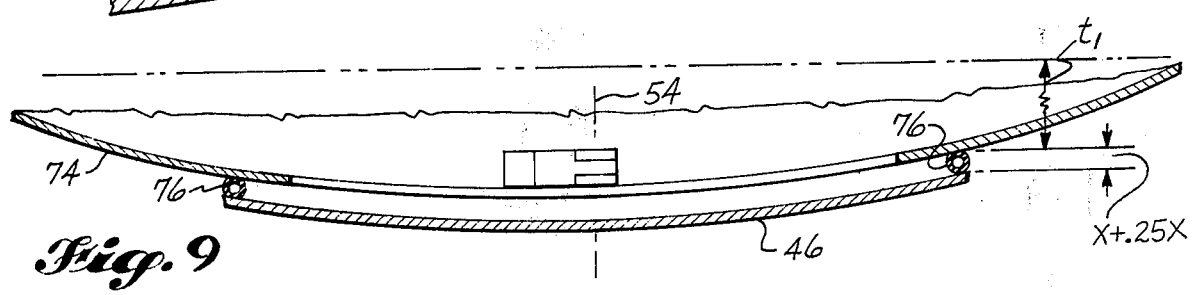
FIG. 9 is a sectional view taken along a line similar to section line 9—9 of FIG. 6 showing a greatly exaggerated outer surface curve of the skin of the vertical stabilizer and showing an exaggerated curve along the seal plate section.
Figure 10:
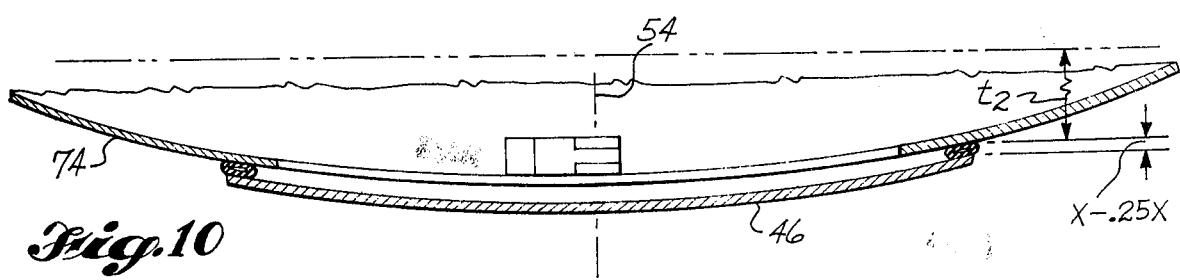
FIG. 10 is a sectional view similar to FIG. 9 taken along a section line similar to line 10—10 of FIG. 7.

A resiliently flexible seal, represented in FIGS. 9 and 10 as a hollow tubular member, is affixed by conventional means (not shown) adjacent the periphery of the seal plate 58 and is positioned so that the seal member 76 is interposed between the inside of the seal plate adjacent its periphery and the outer surface of the skin 74 of the vertical stabilizer underlying the seal plate periphery. The distance $x$ is dependent upon the particular seal 76 chosen. For purposes of the invention, it is necessary that the seal member be both flexible and resilient, i.e., when the seal is placed under a compression load, it will compress, reducing its transverse dimension. For purposes of explanation and illustration in FIGS. 9 and 10, this flexibility range of the seal is represented as $x \pm 0.25x$ corresponding to the range of thickness change in the airfoil surface under a given point on the seal plate as the seal plate moves between its full up and down positions. When the seal plate is at its mean position and its periphery is spaced approximately $x$ distance from the vertical stabilizer skin, the seal 76 is partially compressed so that it can further compress transversely by an amount equal to $0.25x$ in one direction as a given point on the seal plate swings about the seal plate axis and moves inwardly toward the airfoil surface and can expand by an amount equal to $0.25x$ as a given point on the seal plate swings about its axis and moves away from the surface of the skin 74. It follows, then, that the uncompressed or unflexed transverse dimension of the peripheral seal 76 interposed between the periphery of the seal plate 46 and the outer surface of the skin 74 must be greater than at least the distance $x$ plus $0.25x$, but yet have the ability to compress to a transverse dimension of $x$ minus $0.25x$.

The cross-sectional view of FIG. 9 is taken along section lines 9—9 of FIG. 6 in which the seal plate 46 is shown in its full down position. In that position, both the forward and rearward bottom corner portions of the seal plate 46 will reside at their greatest distance from the surface of the skin 74, i.e., a distance for purposes of illustration chosen as $x$ plus $0.25x$. In this position the seal member 76 will be resiliently expanded so that sealing engagement is maintained between the seal 76 and the outer surface of the skin 74, thereby maintaining an airtight seal between the seal plate periphery and the outer surface of the vertical stabilizer. The cross-sectional view of FIG. 10 is taken along section lines 10—10 of FIG. 7, which shows the seal plate 46 in its full up position. In this position the bottom corner portions of the periphery of the seal plate 46 reside at the least distance from the surface of the skin 74 of the vertical stabilizer. As shown in FIG. 10, the seal member 76 has been compressed to the maximum extent required for purposes of the invention, i.e., a distance corresponding to $x$ minus $0.25x$. In this manner, constant sliding and sealing contact with the vertical stabilizer skin is maintained around the entire periphery of the seal plate 46 as the seal plate swings with the horizontal stabilizer between its full up and full down positions. The seal member 76, because of its resilient flexibility, compresses and expands to fill the gap between the periphery of the seal plate 46 and the surface of the skin 74 in any given position of the seal plate 46. Because the change in curvature of the airfoil for an operational vertical stabilizer is relatively small between the extreme operating positions of the periphery of the seal plate 46, the relative compressibility of the seal member, i.e., the dimension $0.50x$ need only be on the order of two-tenths to three-tenths on an inch.

The enlarged sectional view of FIG. 11 illustrates the significant advantage of this invention. The sectional view is taken along a chord percentage reference line. Along this section, it is seen that the outer surface of the vertical stabilizer that underlies the seal plate 46 is straight while the seal member 76 maintains its engagement with the outer surface of the vertical stabilizer. The contour of the outer skin of the vertical stabilizer at this location, and at all other locations remains the same as dictated by the basic airfoil shape of the stabilizer. The seal assembly of the present invention, through the unique shaping of the seal plate periphery and the provision of a properly chosen, resiliently flexible seal member eliminates the need to reshape the surface of the vertical stabilizer as required by prior art seal structures. In addition, the seal plate is relatively easy to construct and the seal member is very easy to maintain and replace, if necessary.

Figure 12A:
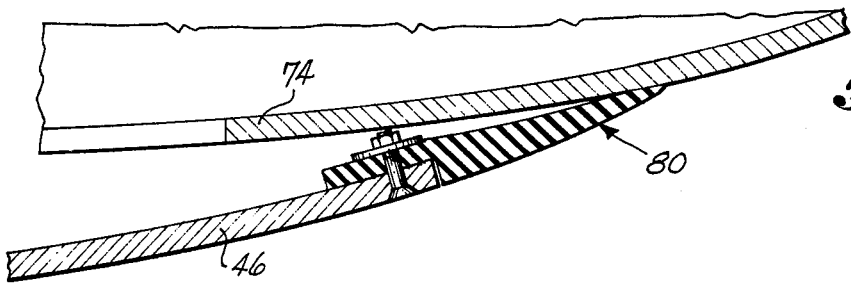
FIGS. 12a, 12b, and 12c are greatly enlarged views of a preferred resilient seal member for use with the improved seal assembly of the present invention.
Figure 12B:
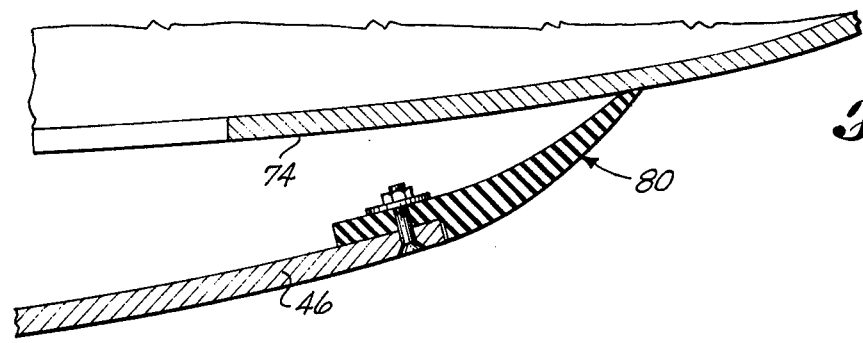
Figure 12C:
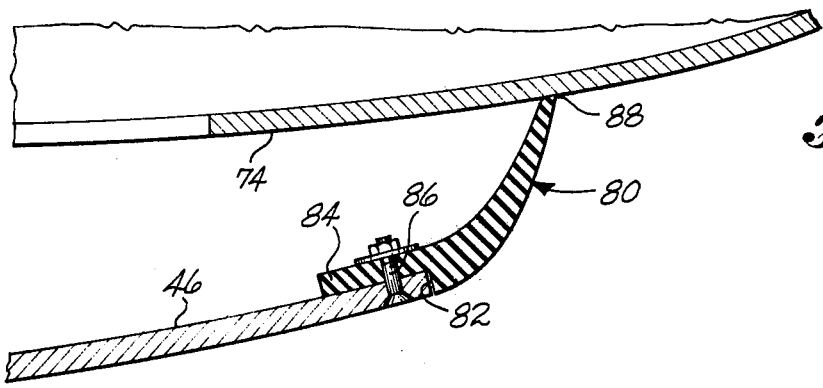

FIGS. 12a, 12b and 12c are illustrations of a blade-type, lip seal member 80 that has the capability to resiliently flex toward and away from the outer surface of the skin 74 of the vertical stabilizer to compensate for the variable distance at which the periphery of the seal plate 46 will reside away from the skin 74 as it is moved between its full up and down positions. The mean position of a given point on the periphery of the seal plate 46 is represented in FIG. 12b while FIGS. 12a and 12c represent the closest and furthest away positions of the given point on the periphery of the seal plate 46 as the seal plate moves with the horizontal stabilizer to full up and down positions.

This type of lip seal member 80 is preferred as it is presently commercially available. Moreover, it provides the capability to provide a smooth curved transition over the gap between the periphery of the seal plate and the outer surface of the vertical stabilizer skin 74. The lip seal member 80 is a relatively flat ribbon having a shoulder 82 along its outwardly facing, inner (relative to the swing axis), longitudinal edge. The depth of the shoulder is chosen equal to the thickness of the seal plate. An inwardly extending flange portion 84 underlies and abuts the seal plate adjacent its periphery. The flange portion 84 is attached to the seal plate by conventional fasteners 86 at spaced locations around the seal plate. The lip seal member 80 extends outwardly, relative to the swing axis, from the seal plate periphery and curves toward the outer surface of the vertical stabilizer skin. The outer portion of the lip seal member 80 tapers slightly to a rounded tip portion 88, which maintains sealing engagement with the outer surface of the vertical stabilizer skin at all positions of the seal plate.

The present invention has been described in relation to a preferred embodiment of the seal assembly of the present invention and an alternate therefor. One of ordinary skill, after reading the foregoing specification, will be able to effect various alterations, changes, and substitutions of equivalents without departing from the intended scope of the invention as set forth in the foregoing portion of the specification. It is therefore intended that the grant of Letters Patent be limited only by the definition contained in the appended claims.

What is claimed is:

1. In an aircraft tail assembly including a vertical stabilizer and a flying horizontal stabilizer, said vertical stabilizer having a skin with a convex, outer airfoil surface, and an opening through said skin to the interior of said vertical stabilizer, said horizontal stabilizer having an inner end positioned adjacent said opening and a structural member affixed thereto and extending through said opening into said vertical stabilizer, and hinge means for mounting said horizontal stabilizer for upward and downward swinging movement about an axis oriented transversely to the chord line of said vertical stabilizer, the improvement comprising:

a seal plate affixed to said horizontal stabilizer adjacent said vertical stabilizer, said seal plate being oriented transversely to said horizontal stabilizer and having a periphery so configured to cover the opening in said vertical stabilizer as said horizontal stabilizer swings about its axis, the periphery of said seal plate being spaced outwardly from the convex, outer surface of the skin of said vertical stabilizer, and;

resilient seal means for sealing said opening relative to the air surrounding said vertical and horizontal stabilizers to retard air flow between the upper and lower surfaces of said horizontal stabilizer, said resilient seal means being affixed to the periphery of said seal plate and interposed between said seal plate and the convex, outer surface of the skin of said vertical stabilizer, said resilient seal means being partially flexed when said horizontal stabilizer is in a first predetermined position so that said seal means can flex bi-directionally transversely to the convex, outer surface of the skin of said vertical stabilizer as said horizontal stabilizer swings about its axis and allows the shape of the contact region of said resilient seal means to vary relative to the shape of the periphery of said seal plate, thereby maintaining a constant sealing relationship between said seal plate and the convex, outer surface of the skin of said vertical stabilizer as said horizontal stabilizer swings about its axis.

2. The assembly of claim 1 wherein the horizontal stabilizer and the hinge means are so constructed to mount the horizontal stabilizer for swinging movement between a full up position and a full down position and a predetermined position between said full up and said full down positions, and wherein the periphery of said seal plate is so configured when said horizontal stabilizer is positioned at said predetermined position as to be substantially equidistantly spaced from the contact region of said resilient seal means on said vertical stabilizer, thereby causing said resilient seal means to be relatively uniformly flexed throughout its length around the periphery of said seal plate when in predetermined position.

3. The assembly of claim 2 wherein said resilient seal means comprises:

a lip seal member affixed to and extending around the periphery of said seal plate, said lip seal member having a periphery spaced outwardly from the periphery of said seal plate, the periphery of said lip seal member extending toward and engaging the outer surface of the skin of said vertical stabilizer in sealing relationship, said lip seal member being capable of flexing inwardly and outwardly relative to the outer surface of the skin of said vertical stabilizer to maintain said sealing relationship with said skin as said horizontal stabilizer swings about its axis.

4. The assembly of claim 2 wherein said resilient seal means comprises:

an elongate resilient tubular member affixed and underlying the periphery of said seal plate, said tubular member extending in its elongate dimension along the periphery of said seal plate, said tubular member being partially compressed in its transverse dimension when said horizontal stabilizer is in said predetermined position.

5. The assembly of claim 2 wherein said predetermined position is the mean position between said full up and said full down positions.

6. The assembly of claim 1 wherein the horizontal stabilizer and the hinge means are so constructed to mount the horizontal stabilizer for swinging movement between a full up position and a full down position and a predetermined position between said full up and said full down positions, and wherein the periphery of said seal plate is so configured when said horizontal stabilizer is positioned at said predetermined position as to be substantially equidistantly spaced outwardly from the portion of the outer surface of the skin of said vertical stabilizer immediately underlying the periphery of said seal plate.

7. The assembly of claim 6 wherein said resilient seal means comprises:

a lip seal member affixed to and extending around the periphery of said sela plate, said lip seal member having a periphery spaced outwardly from the periphery of said seal plate, the periphery of said lip seal member extending inwardly toward and engaging the outer surface of the skin of said vertical stabilizer in sealing relationship, said lip seal being capable of flexing inwardly and outwardly relative to the outer surface of the skin of said vertical stabilizer to maintain said sealing relationship with said skin as said horizontal stabilizer swings about its axis.

8. The assembly of claim 6 wherein said resilient seal means comprises an elongate resilient tubular member affixed to and underlying the periphery of said seal plate, said tubular member extending in its elongate dimension along the periphery of said seal plate, said tubular member being partially compressed in its transverse dimension when said horizontal stabilizer is in said predetermined position.

9. The assembly of claim 6 wherein said predetermined position is the mean position between said full up and said full down positions.

* * * * *

UNITED STATES PATENT AND TRADEMARK OFFICE
CERTIFICATE OF CORRECTION

PATENT NO. : 4,034,939
DATED : July 12, 1977
INVENTOR(S) : Thomas R. Ridley, Jr.

It is certified that error appears in the above-identified patent and that said Letters Patent are hereby corrected as shown below:

Column 10, line 61: delete "sela" and insert therefor —seal—.

Column 10, line 67: before the word "being" insert —member—.

Signed and Sealed this

First Day of November 1977

[SEAL]

Attest:

RUTH C. MASON
Attesting Officer

LUTRELLE F. PARKER
Acting Commissioner of Patents and Trademarks